United States Patent
Yamasaki et al.

(10) Patent No.: US 8,564,887 B2
(45) Date of Patent: Oct. 22, 2013

(54) ZOOM LENS AND IMAGE PICKUP APPARATUS

(75) Inventors: Shinji Yamasaki, Utsunomiya (JP); Shinichiro Saito, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 31 days.

(21) Appl. No.: 13/182,072

(22) Filed: Jul. 13, 2011

(65) Prior Publication Data

US 2012/0013992 A1    Jan. 19, 2012

(30) Foreign Application Priority Data

Jul. 13, 2010    (JP) .................................. 2010-158663

(51) Int. Cl.
*G02B 15/14*    (2006.01)

(52) U.S. Cl.
USPC .......................................... 359/682; 359/689

(58) Field of Classification Search
CPC ....... G02B 15/14; G02B 15/16; G02B 15/177
USPC .................... 359/676–683, 686, 689
See application file for complete search history.

(56) References Cited

U.S. PATENT DOCUMENTS

| | | | | |
|---|---|---|---|---|
| 6,040,949 | A * | 3/2000 | Ohno ............................. | 359/689 |
| 7,729,058 | B2 * | 6/2010 | Hozumi et al. ............... | 359/680 |
| 2001/0036020 | A1 | 11/2001 | Yamamoto | |
| 2003/0169509 | A1 | 9/2003 | Iyama | |
| 2011/0102640 | A1 * | 5/2011 | Iiyama et al. ............. | 348/240.3 |

FOREIGN PATENT DOCUMENTS

| | | |
|---|---|---|
| JP | 2001-208969 A | 8/2001 |
| JP | 2005-099091 A | 4/2005 |
| JP | 2006-276897 A | 10/2006 |
| JP | 2006-343534 A | 12/2006 |
| JP | 2009-204699 A | 9/2009 |
| JP | 2011-069889 A | 4/2011 |
| WO | 2010/001546 A1 | 1/2010 |

OTHER PUBLICATIONS

Extended European Search Report for corresponding EP 11172995. 0. Dated Feb. 16, 2012.
Partial European Search Report issued in corresponding European Patent Application 11 17 2995 dated Oct. 31, 2011.
Notification of First Office Action for corresponding CN 201110197079.8, mail date Jun. 5, 2013. English translation provided.

* cited by examiner

Primary Examiner — Darryl J Collins
(74) Attorney, Agent, or Firm — Rossi, Kimms & McDowell LLP

(57) ABSTRACT

A zoom lens comprising, in order from an object side to an image side, a first lens unit having a negative refractive power, a second lens unit having a positive refractive power, and a third lens unit having a positive refractive power. The second and third lens units are configured to move in an optical axis direction for a magnification variation, and the first lens unit is configured to move in the optical axis direction to reduce an image-plane fluctuation associated with the magnification variation. Expressions $-0.83 \le f1/f2 \le -0.40$ and $-4.6 \le f1/fw \le -2.5$ T are satisfied where f1 is a focal length of the first lens unit, f2 is a focal length of the second lens unit, and fw is a focal length of the entire zoom lens at a wide angle end.

8 Claims, 10 Drawing Sheets

ZOOM LENS AND IMAGE PICKUP APPARATUS

BACKGROUND OF THE INVENTION

1. Field of the Invention

The present invention relates to a zoom lens used for an image pickup apparatus, such as a video camera and a digital still camera.

2. Description of the Related Art

An image pickup apparatus, such as a video camera, a surveillance camera, a digital still camera, a broadcast camera, which uses an image pickup element, such as a CCD sensor and a CMOS sensor, requires a zoom lens having a small configuration, a wide angle of view, a high zoom ratio, and a high optical performance for a high pixel density of the image pickup element. In particular, a zoom lens having a small F-number is demanded for night photography of a dark object, etc.

In order to satisfy these demands, Japanese Patent Laid-Open No. 2009-204699 ("JP") discloses a two-unit zoom lens that includes, in order from an object side to an image side, a first lens unit having a negative refractive power, and a second lens unit having a positive refractive power. This two-unit zoom lens varies a magnification by moving the second lens unit in an optical axis direction, and corrects an image-plane fluctuation associated with magnification variations by moving the first lens unit. In addition, this two-unit zoom lens is a vari-focal type zoom lens having a super-wide angle of view exceeding 100°.

JPs 2001-208969 and 2005-099091 disclose a three-unit zoom lens in which a third lens unit is added to the above two-unit zoom lens.

However, the negative/positive type of two-unit zoom lens disclosed in JP 2009-204699 has a difficulty in sufficiently reducing a variety of aberrations, such as a lateral chromatic aberration for the image pickup element having the high pixel density. In addition, the three-unit zoom lens disclosed in JP 2001-208969 has a difficulty in miniaturization due to the increased number of lenses because the third lens unit is added as a fixed unit to the negative/positive type of two-unit zoom lens.

Moreover, the three-unit zoom lens disclosed in JP 2005-099091 is a negative/positive/positive type, and all lens units are configured to be movable. However, its diagonal angle of view is about 80° at the wide angle end or an insufficient wide angle of view. In addition, its F-number is about 2.8 or large (dark).

SUMMARY OF THE INVENTION

The present invention provides a small zoom lens and an image pickup apparatus having the same, which has a wide angle of view, a high zoom ratio, and a high optical performance over an overall zoom range.

A zoom lens according to one aspect of the present invention includes, in order from an object side to an image side, a first lens unit having a negative refractive power, a second lens unit having a positive refractive power, and a third lens unit having a positive refractive power. The second and third lens units are configured to move in an optical axis direction for a magnification variation, and the first lens unit is configured to move in the optical axis direction to reduce an image-plane fluctuation associated with the magnification variation. Conditions $-0.83 \leq f1/f2 \leq -0.40$ and $-4.6 \leq f1/fw \leq -2.5$ are satisfied where $f1$ is a focal length of the first lens unit, $f2$ is a focal length of the second lens unit, and $fw$ is a focal length of the entire zoom lens at a wide angle end.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention. Further to the concrete description of the embodiment, a description will be given of common points to each embodiment.

The zoom lens of each embodiment is a three-unit zoom lens that includes, in order from an object side to an image side, a first lens having a negative refractive power, a second lens unit having a positive refractive power, a third lens unit having a positive refractive power. This zoom lens provides a magnification variation (zooming) by moving the second and third lens units in the optical axis directions, and moves the first lens unit in the optical axis direction so as to reduce (correct) the image-plane fluctuation associated with the magnification variation. Since the third lens unit is moved for magnification variations with the second lens unit, the refractive power necessary for the second lens unit can be made smaller and the good optical performance can be easily obtained.

The zoom lens of each embodiment is used for an image pickup lens for a variety of image pickup apparatuses each of which includes an image pickup element, which will be described later, such as a video camera, a digital camera, a surveillance camera, and a broadcast camera. In the lens sectional views illustrated in FIGS. 1, 3, 5, 7, and 9, the left side is the object side (front side) on which the object is located, and the right side is the image side (backside) on which the image pickup element is arranged.

In the lens sectional view of each embodiment, L1 denotes the first lens unit having the negative refractive power (optical power=an inverse number of a focal length), L2 denotes the second lens unit having the positive refractive power, and L3 denotes the third lens unit having the positive refractive power. SP denotes an aperture stop, located on the object side of the second lens unit L2 (between the first lens unit L1 and the second lens unit L2).

Figure 1:
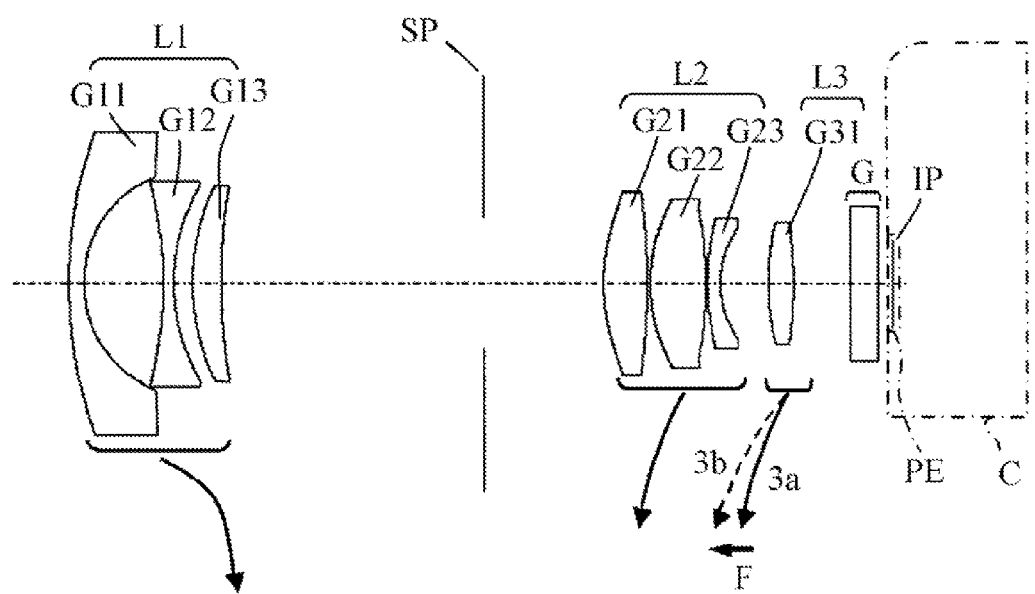
FIG. 1 is a sectional view of a zoom lens at a wide angle end according to a first embodiment of the present invention.

G denotes an optical block corresponding to an optical filter, a face plate, etc. IP denotes an image plane. As illustrated in FIG. 1, an image pickup plane of the image pickup element (photoelectric conversion element) PE, such as a CCD sensor and a CMOS sensor, is arranged on the image plane IP. C is an image pickup apparatus in which the zoom lens is integrated or exchangeably attached.

FIGS. 2, 4, 6, 8, and 10 illustrate aberrational diagrams of zoom lenses of respective embodiments at (a) a wide angle end, (b) an intermediate zoom position, and (c) a telephoto end. In each aberrational diagram, "d" denotes an aberration to the d-line, "g" denote an aberration to the g-line, ΔM is an aberration on the meridional image plane, and ΔS denotes an aberration on the sagittal image plane. "F" denotes an F-number, and "ω" denotes half an angle of view.

For a "spherical aberration," a spherical aberration to the d-line (solid line) and a spherical aberration to g-line (dotted line) are illustrated. For an "astigmatism," an astigmatism on the ΔM to the d-line and an astigmatism on the ΔS to the d-line are illustrated. For a "distortion," a distortion to the d-line is illustrated. For a "lateral chromatic aberration," a lateral chromatic aberration of the g-line to the d-line is illustrated.

In each embodiment, the wide angle end and the telephoto end are zoom positions when the second lens unit L2 and the third lens unit L3 that are magnification-varying lens units are mechanically positioned at both ends of the movable range in the optical axis direction.

In zooming from the wide angle end to the telephoto end, the second lens unit L2 and the third lens unit L3 are moved to the object side for the magnification variations, and the first lens unit L1 is moved to the image side to reduce the image-plane fluctuations. Moreover, in order to reduce the image-plane fluctuations in zooming from the wide angle end to the telephoto end, the third lens unit L3 is moved to the object side. In each lens sectional view, a curve (solid line) 3a and a curve (dotted line) 3b indicate moving loci of the third lens unit L3 to reduce the image-plane fluctuations in zooming from the wide angle end to the telephoto end in the in-focus states to the infinitely distant object and the close range object. For example, at the telephoto end, in focusing from the infinitely distant object to the close range object, as illustrated in an arrow F, the third lens unit L3 is moved to the object side.

In each embodiment, the aperture stop SP is fixed during zooming and focusing.

Each embodiment satisfies the following conditions where f1 is a focal length of the first lens unit, f2 is a focal length of the second lens unit, and fw is a focal length of the entire zoom lens at a wide angle end:

$$-0.83 \leq f1/f2 \leq -0.40 \tag{1}$$

$$-4.6 \leq f1/fw \leq -2.5 \tag{2}$$

The conditions (1) and (2) are provided to realize a small zoom lens having a high optical performance over the overall zoom range while a wide angle of view and a high zoom ratio are maintained.

The condition (1) is provided to limit a relationship between the focal length of the second lens unit as one magnification-varying lens unit and the focal length of the first lens unit. The first lens unit needs a comparatively strong power to form a negative lead type zoom lens for a wide angle of view, and an appropriate power to serve as a compensator unit configured to correct the image-plane fluctuation associated with the magnification variation. Moreover, the second lens unit needs a positive power for a magnification variation effect. Hence, the condition (1) is provided for well balance of the powers of the second lens unit and the first lens unit.

When a value of f1/f2 exceeds the upper limit of the condition (1), the focal length f1 of the first lens unit becomes excessively large (or its absolute value becomes small), and the negative power of the first lens unit becomes excessively large. Thereby, correction balancing destroys between the curvature of field and chromatic aberration for the entire zoom lens. In addition, the focal length f2 of the second lens unit becomes large, and the positive power of the second lens unit becomes excessively small. Thereby, a moving amount of the second lens unit used for magnification variations increases, and the overall length of the zoom lens and the diameter of the first lens unit become large.

When the value of f1/f2 becomes smaller than the lower limit of the condition (1), the focal length f1 of the first lens unit becomes small (or its absolute value becomes large), and the negative power of the first lens unit becomes excessively small. Thereby, a moving amount of the first lens unit as the compensator unit from the wide angle end to the telephoto end increases, the overall length of the zoom lens and the diameter of the first lens unit become large. In addition, the focal length f2 of the second lens unit becomes small, and the positive power of the second lens unit becomes excessively large. Thereby, fluctuations of a variety of aberrations, such as a spherical aberration, become large in varying magnifications.

The condition (2) is provided to properly set the power of the first lens unit when the focal length of the entire zoom lens is made small on the wide angle end. When the value of f1/fw exceeds the upper limit of the condition (2), the focal length f1 of the first lens unit becomes large (or its absolute value becomes small), the negative power of the first lens unit becomes excessively large. Thereby, balancing of the aberrations among lens units becomes difficult, and it becomes difficult to properly correct a variety of aberrations, such as a curvature of field and a chromatic aberration.

In addition, when the value of f1/fw becomes smaller than the lower limit of the condition (2), the focal length f1 of the first lens unit becomes large (or its absolute value becomes small), and the negative power of the first lens unit becomes excessively small. Thereby, a wide angle-of-view configuration becomes difficult and a moving amount of the first lens unit from the wide angle end to the telephoto end increases, and the overall length of the zoom lens and the diameter of the first lens unit become large.

The upper limits and the lower limits of the conditions (1) and (2) may be set as follows:

$$-0.79 \leq f1/f2 \leq -0.49 \tag{1a}$$

$$-4.4 \leq f1/fw \leq -2.7 \tag{2a}$$

Thus, each embodiment satisfies the conditions (1) and (2), and realizes a small zoom lens having a high optical performance over the overall zoom range while a wide angle of view and a high zoom ratio are maintained.

In order to obtain a better optical performance, the zoom lens of each embodiment may further satisfy at least one of the following conditions in addition to the conditions (1) and (2):

In focusing from the in-focus state upon an infinitely distant object to the in-focus state upon the closest object the third lens unit to the object may be moved and the following condition (3) may be satisfied where f3 is a focal length of the third lens unit:

$$0.85 \le f3/f2 \le 2.50 \quad (3)$$

This condition is provided to properly set the power of the third lens unit that provides focusing. Like the negative/positive two-unit vari-focal type, the first lens unit may be used for focusing, but this method has a disadvantage in that a larger diameter of the first lens unit than that of another lens unit. This problem is one defect of the negative lead type zoom lens. As the diameter (or weight) of the first lens unit becomes large, a mechanical load used to move the first lens unit during focusing increases, and fast focusing becomes difficult. Therefore, the focusing unit is set to the third lens unit that is closest to the image plane side and can be made lightweight, and its power is properly set.

As the focal length of the third lens unit is long so that a value of f3/f2 exceeds the upper limit of the condition (3), the positive refractive power of the third lens unit can be made smaller and suitable for aberrational corrections. However, the back focus of the zoom lens becomes longer. As a result, the overall length of the zoom lens becomes long.

As the value of f3/f2 is smaller than the lower limit of the condition (3), the focal length of the third lens becomes short, the power of the third lens unit becomes excessively large, and the spherical aberration and coma increase in the overall zooming range.

The upper limit and the lower limit of the condition (3) may be set as follows:

$$0.90 \le f3/f2 \le 2.20 \quad (3a)$$

The following condition (4) may be satisfied where $\beta 3w$ is an imaging magnification of the third lens unit on the wide angle end, and $\beta 3t$ is an imaging magnification of the third lens unit on the telephoto end:

$$1.0 \le |\beta 3w/\beta 3t| \le 8.0 \quad (4)$$

This condition is provided to properly obtain a magnification variation effect with the third lens unit as one magnification-varying lens unit. As a value of $|\beta 3w/\beta 3t|$ exceeds the upper limit of the condition (4), the effect of the third lens unit which contributes to the magnification variation becomes large, the power of the third lens unit becomes consequently large, and the spherical aberration and coma increase in the overall zooming range.

As the value of $|\beta 3w/\beta 3t|$ becomes smaller than the lower limit of the condition (4), the effect of the third lens unit which contributes to the magnification variation becomes excessively small, and the magnification variation allotment of the second lens unit becomes large. Therefore, the power of the second lens unit needs to be larger, and consequently large fluctuations of a variety of aberrations, such as a spherical aberration, occur in the magnification variation.

The upper limit and the lower limit of the condition (4) may be set as follows:

$$1.2 \le |\beta 3w/\beta 3t| \le 6.7 \quad (4a)$$

The following condition may be satisfied where $\beta 2w$ is an imaging magnification of the second lens unit on the wide angle end, and $\beta 2t$ is an imaging magnification of the second lens unit on the telephoto end:

$$0.01 \le |\beta 2w/\beta 2t| \le 0.35 \quad (5)$$

This condition is provided to properly obtain a magnification variation effect with the second lens unit as one magnification-varying lens unit. As a value of $|\beta 2w/\beta 2t|$ exceeds the upper limit of the condition (5), the effect of the second lens unit which contributes to the magnification variation becomes large, the power of the second lens unit becomes consequently large, and large fluctuations of a variety of aberrations, such as a spherical aberration, occur during magnification variations.

When the value of $|\beta 2w/\beta 2t|$ is smaller than the lower limit of the condition (5), the effect of the second lens unit which contributes to the magnification variation becomes excessively small, and the magnification variation allotment of the third lens unit becomes large. Therefore, the spherical aberration and coma increase in the overall zooming range.

The upper limit and the lower limit of the condition (5) may be set as follows:

$$0.03 \le |2w/\beta 2t| \le 0.27 \quad (5a)$$

The zoom lens of each embodiment distributes the magnification variation effect between the second lens unit and the third lens unit by allowing them to individually move. Therefore, the conditions (4) and (5) may be satisfied at the same time. Thereby, the well-balanced magnification variation allotment can be realized between the second lens unit and the third lens unit, and is suitable for the aberrational corrections in the overall zooming range.

The following condition may be satisfied where v(2−3)P is an average Abbe number of positive lenses included in the second lens unit and the third lens unit:

$$50 \le v(2-3)P \quad (6)$$

This condition is provided to limit a characteristic of the material of the positive lens included in the second lens unit and the third lens unit as magnification-varying lenses units. More specifically, this condition is necessary for each positive lens to have a low dispersion glass characteristic so as to properly correct the chromatic aberration. When a value of v(2−3)P becomes smaller than the lower limit of the condition (6), the correction of the chromatic aberration becomes insufficient and color blurs of an optical image formed by the zoom lens stand out.

The upper limit and the lower limit of the condition (6) may be set as follows:

$$55 \le v(2-3)P \quad (6a)$$

The first lens unit may include a positive lens, and the following conditions (7) and (8) may be satisfied where N1P is a refractive index of the positive lens included in the first lens unit, and v1P is an Abbe number of the positive lens included in the first lens unit. When the first lens unit includes a plurality of positive lenses, the refractive index N1P and the Abbe number v1P are an average refractive index and an average Abbe number of the plurality of positive lenses:

$$1.85 \le N1P \le 2.15 \quad (7)$$

$$13 \le v1P \le 25 \quad (8)$$

The conditions (7) and (8) are provided to restrict a characteristic of a material of the positive lens included in the first lens unit. When a value of the N1P exceeds the upper limit of the condition (7), the spherical aberration that particularly occurs at the telephoto end is likely to increase in the under direction. On the other hand, when the value of N1P becomes smaller that the lower limit of the condition (7), the spherical aberration at the telephoto end is likely to increase in the over direction. In addition, it becomes necessary to reduce the radius of curvature or to change the lens thickness so as to maintain the power of the positive lens, and the miniaturization becomes difficult.

The condition (8) relates to the correction of the chromatic aberration. The chromatic aberration that occurs in the negative lens included in the first lens unit can be cancelled out by using the positive lens that satisfies the condition (8).

When a value of ν1P exceeds the upper limit of the condition (8), the lateral chromatic aberration particularly increases. For example, the aberration of the d-line to the g-line or F-line on the short wavelength side increases in the under direction.

On the other hand, when the value of ν1P is smaller than the lower limit of the condition (8), the lateral chromatic aberration occurs similar to a case where the value exceeds the upper limit. In this case, the aberration of the d-line to the g-line or F-line on the short wavelength side increases in the over direction.

The upper limits and the lower limits of the conditions (7) and (8) may be set as follows:

$$1.88 \leq N1P \leq 2.00 \tag{7a}$$

$$16 \leq \nu 1P \leq 22 \tag{8a}$$

The following condition (9) may be satisfied where ft is a focal length of the entire zoom lens at the telephoto end, and M2 is a moving amount (absolute value) of the second lens unit in the magnification variation from the wide angle end to the telephoto end:

$$0.9 \leq M2/\sqrt{(fw \cdot ft)} \leq 2.1 \tag{9}$$

This condition is provided to limit the moving amount of the second lens unit. When the value of $M2/\sqrt{(fw \cdot ft)}$ exceeds the upper limit of the condition (9), the moving amount of the second lens unit becomes excessively large and the overall length of the zoom lens becomes large.

On the other hand, the value of $M2/\sqrt{(fw \cdot ft)}$ smaller than the lower limit of the condition (9) causes an insufficient moving amount of the second lens unit, and an insufficient magnification variation. Hence, a high zoom ratio is hard to obtain.

The upper limit and the lower limit of the condition (9) may be set as follows:

$$1.1 \leq M2/\sqrt{(fw \cdot ft)} \leq 1.9 \tag{9a}$$

The following condition (10) may be satisfied where M3 is a moving amount of the third lens unit in the magnification variation from the wide angle end to the telephoto end:

$$0.9 \leq M3/\sqrt{(fw \cdot ft)} \leq 2.1 \tag{10}$$

This condition is provided to limit a moving amount of the third lens unit. When the value of $M3/\sqrt{(fw \cdot ft)}$ exceeds the upper limit of the condition (9), the moving amount of the third lens unit becomes excessively large and the overall length of the zoom lens becomes large.

On the other hand, the value of $M3/\sqrt{(fw \cdot ft)}$ being smaller than the lower limit of the condition (10) causes an insufficient moving amount of the third lens unit, and an insufficient magnification variation. Therefore, the high zoom ratio is hard to obtain.

The upper limit and the lower limit of the condition (10) may be set as follows:

$$1.1 \leq M3/\sqrt{(fw \cdot ft)} \leq 1.9 \tag{10a}$$

A description will now be given of more specific illustrations of the embodiments. The lens configuration of each embodiment will be described in order from the object side to the image side.

First Embodiment

In a zoom lens according to a first embodiment illustrated in FIG. 1, the first lens unit L1 includes a negative lens G11 having a meniscus shape that has a convex surface on the object side, a negative lens G12 having a biconcave shape, and a positive lens G13 having a meniscus shape that has a convex surface on the object side.

The second lens unit L2 includes a positive lens G21 having a biconvex shape, a positive lens G22 having a biconvex shape, and a negative lens G23 having a meniscus shape that has a convex surface on the object side. The positive lens G21 has an aspheric shape on both surfaces, and thereby well correcting a variety of aberrations in the overall zoom range including a spherical aberration on the wide angle end.

The third lens unit L3 includes a positive lens G31 having a biconvex shape.

Figure 2:
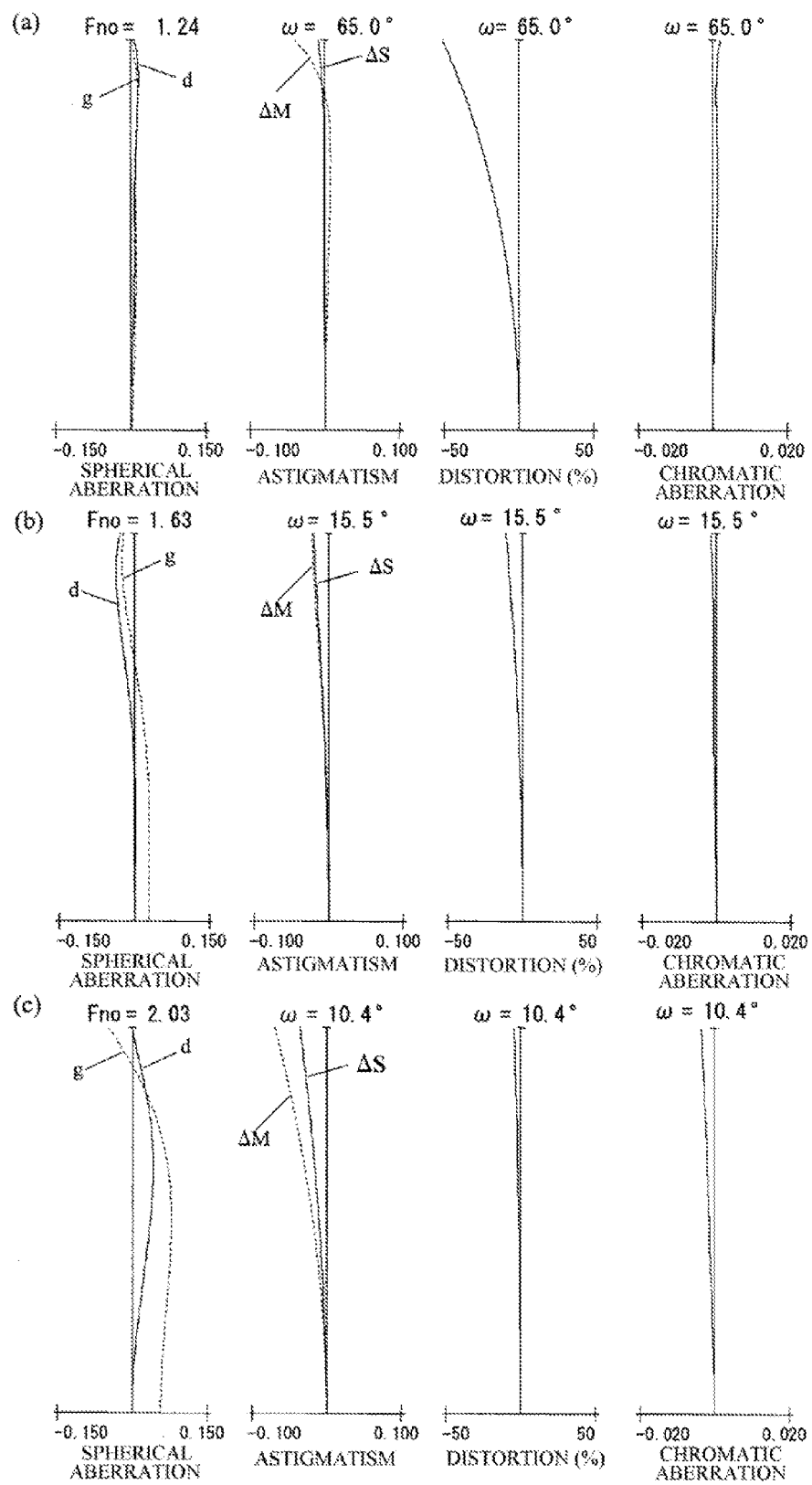
FIG. 2 is an aberrational diagram of a zoom lens at the wide angle end, an intermediate zoom position, and a telephoto end according to the first embodiment.

Table 1 illustrates data of numerical example 1 corresponding to the first embodiment. FIG. 2 illustrates an aberrational diagram of the first embodiment (numerical example 1).

Second Embodiment

Figure 3:
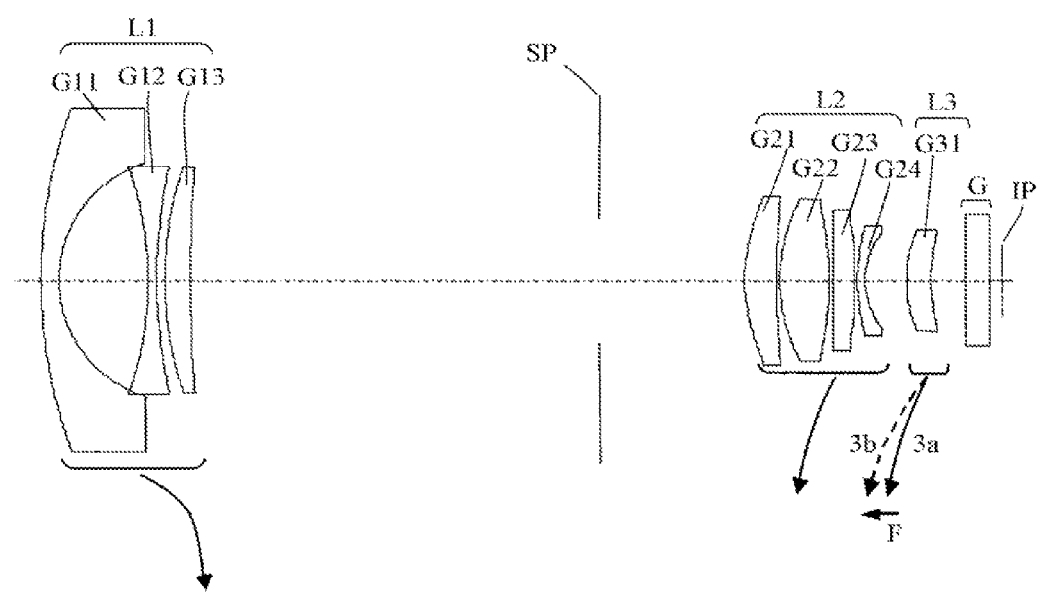
FIG. 3 is a sectional view a zoom lens at a wide angle end according to a second embodiment of the present invention.

In a zoom lens according to a second embodiment illustrated in FIG. 3, the first lens unit L1 includes a negative lens G11 having a meniscus shape that has a convex surface on the object side, a negative lens G12 having a biconcave shape, and a positive lens G13 having a meniscus shape that has a convex surface on the object side.

The second lens unit L2 includes a positive lens G21 having a meniscus shape that has a convex surface on the object side, a positive lens G22 having a biconvex shape, and a positive lens G23 having a biconvex shape, and a negative lens G24 having a meniscus shape that has a convex surface on the object side. The positive lens G21 has aspheric shapes on both surfaces.

The third lens unit L3 includes a positive lens G31 having a meniscus shape that has a convex surface on the object side.

Figure 4:
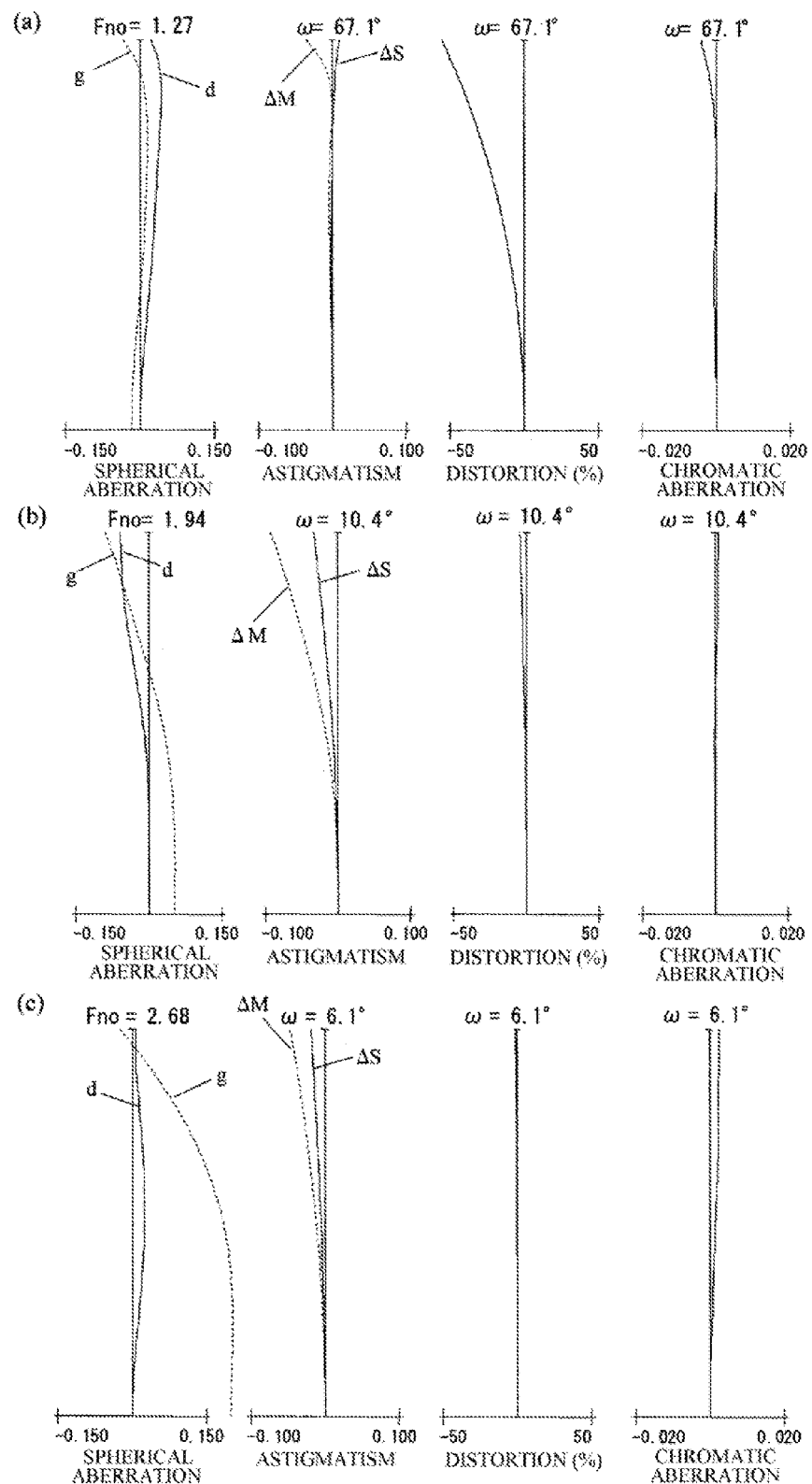
FIG. 4 is an aberrational diagram of a zoom lens at the wide angle end, an intermediate zoom position, and a telephoto end according to the second embodiment.

Table 2 illustrates data of numerical example 2 corresponding to the second embodiment. FIG. 4 illustrates an aberrational diagram of the second embodiment (numerical example 2).

Third Embodiment

Figure 5:
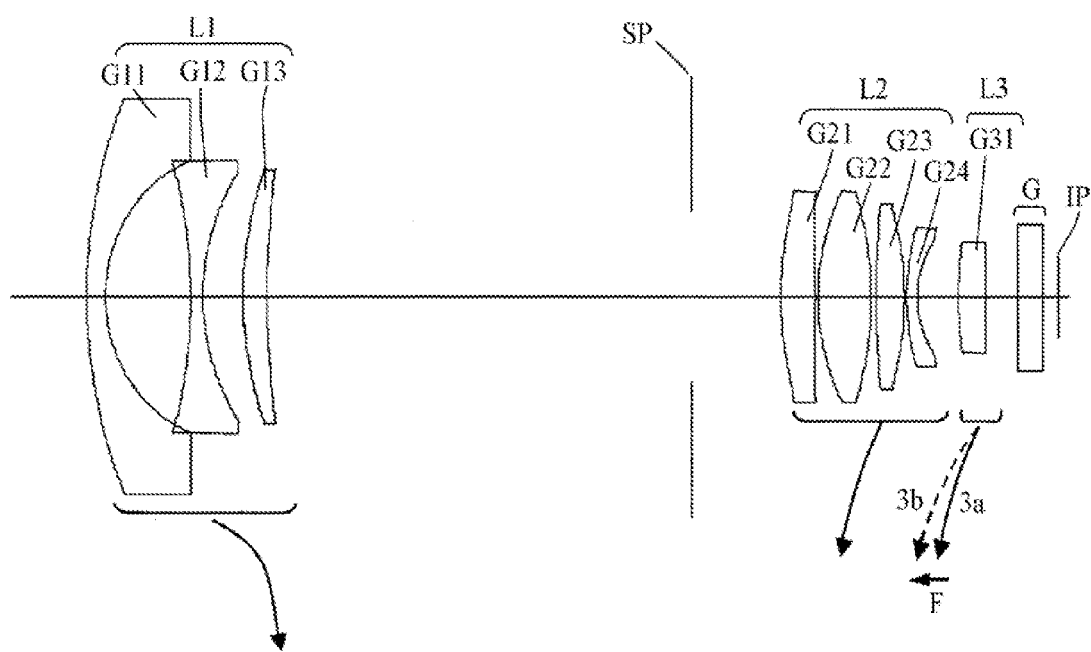
FIG. 5 is a sectional view of a zoom lens at a wide angle end according to a third embodiment of the present invention.

In a zoom lens according to a third embodiment illustrated in FIG. 5, the first lens unit L1 includes a negative lens G11 having a meniscus shape that has a convex surface on the object side, a negative lens G12 having a biconcave shape, and a positive lens G13 having a meniscus shape that has a convex surface on the object side.

The second lens unit L2 includes a positive lens G21 having a biconvex shape, a positive lens G22 having a biconvex shape, a positive lens G23 having a biconvex shape, and a negative lens G24 having a meniscus shape that has a convex surface on the object side. The positive lens G21 has aspheric shapes on both surfaces.

The third lens unit L3 includes a positive lens G31 having a meniscus shape that has a convex surface on the object side.

Figure 6:
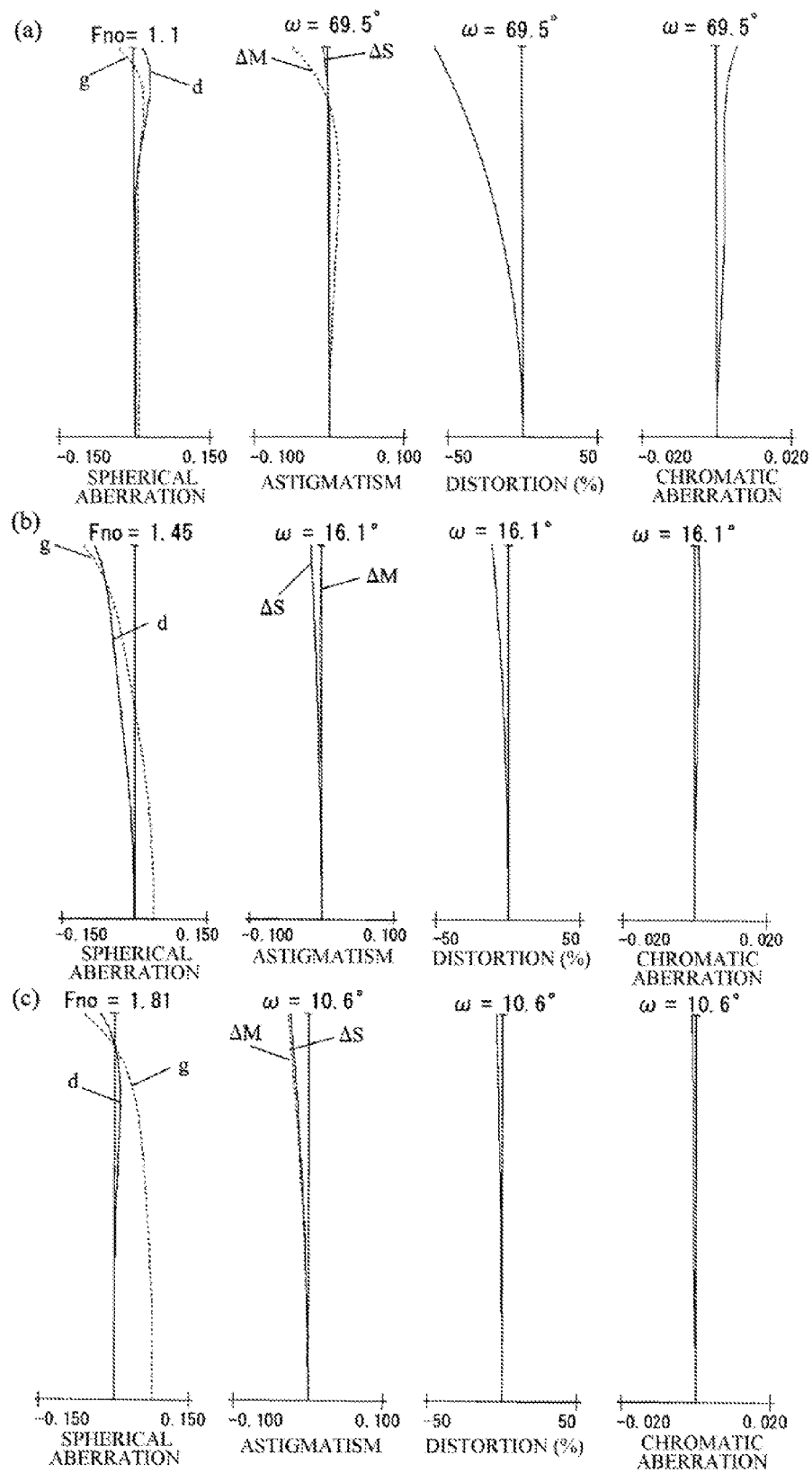
FIG. 6 is an aberrational diagram of a zoom lens at the wide angle end, an intermediate zoom position, and a telephoto end according to the third embodiment.

Table 3 illustrates data of numerical example 3 corresponding to the third embodiment. FIG. 6 illustrates an aberrational diagram of the third embodiment (numerical example 3).

Fourth Embodiment

Figure 7:
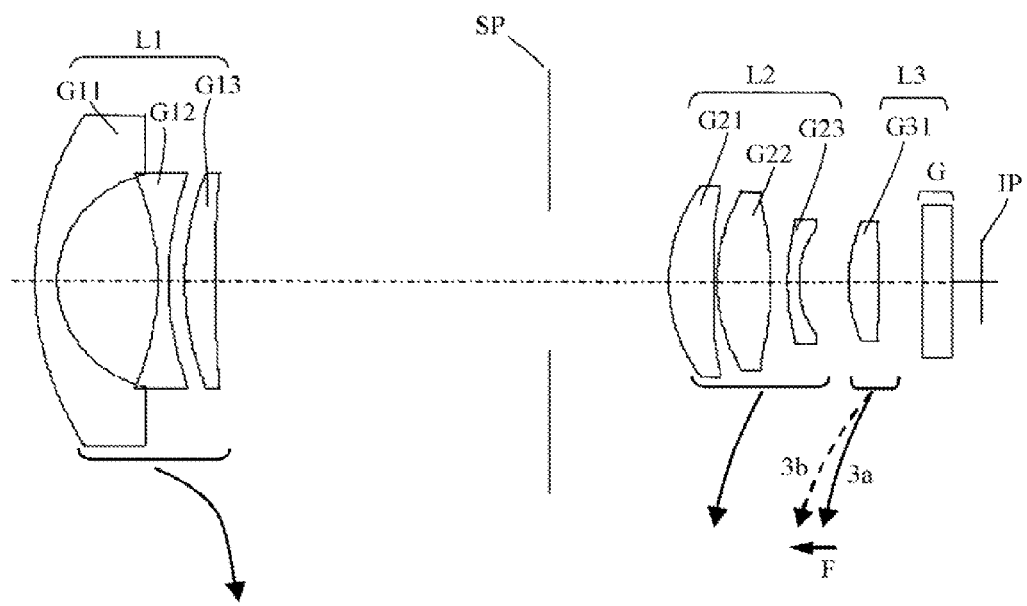
FIG. 7 is a sectional view of a zoom lens at a wide angle end according to a fourth embodiment of the present invention.

In a zoom lens according to a fourth embodiment illustrated in FIG. 7, the first lens unit L1 includes a negative lens G11 having a meniscus shape that has a convex surface on the object side, a negative lens G12 having a biconcave shape, and a positive lens G13 having a meniscus shape that has a convex surface on the object side.

The second lens unit L2 includes a positive lens G21 having a meniscus shape that a convex surface on the object side, a positive lens G22 having a biconvex shape, and a negative lens G23 having a meniscus shape that has a convex surface on the object side. The positive lens G21 has aspheric shapes on both surfaces.

The third lens unit L3 includes a biconvex positive lens G31.

Figure 8:
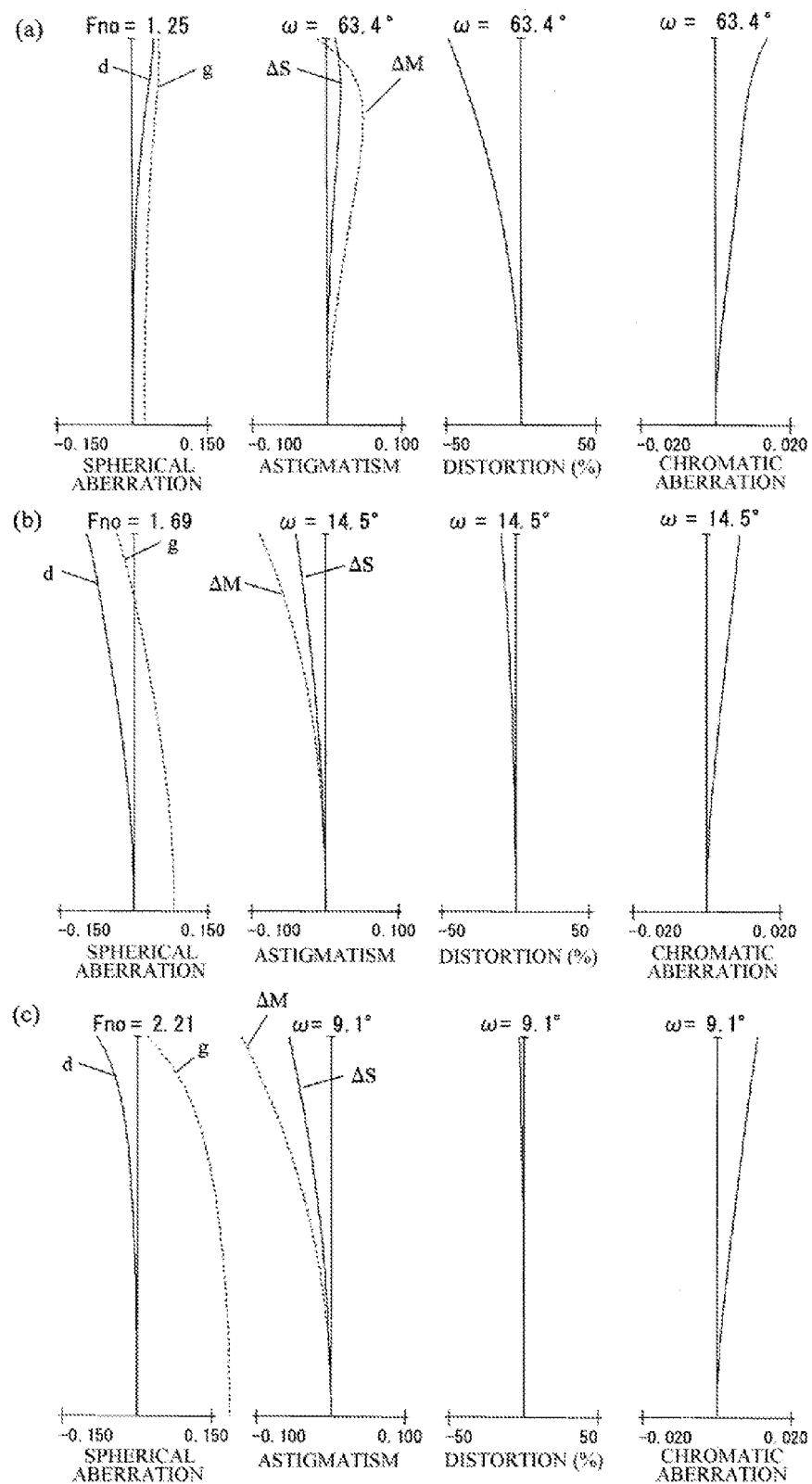
FIG. 8 is an aberrational diagram of a zoom lens at the wide angle end, an intermediate zoom position, and a telephoto end according to the fourth embodiment.

Table 4 illustrates data of numerical example 4 corresponding to the fourth embodiment. FIG. 8 illustrates an aberrational diagram of the fourth embodiment (numerical example 4).

Fifth Embodiment

Figure 9:
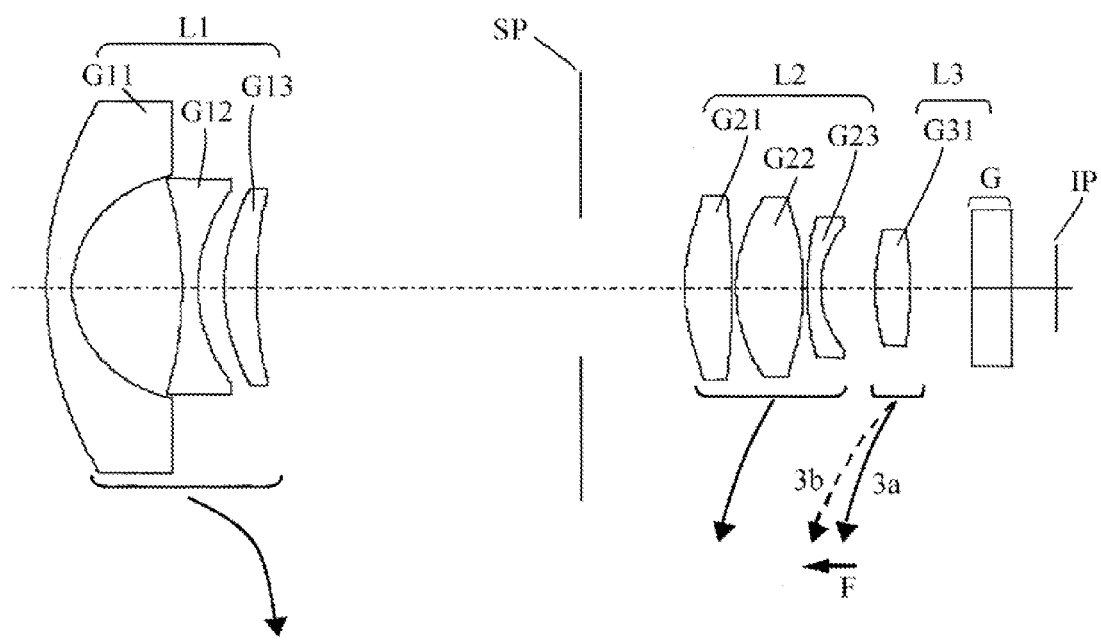
FIG. 9 is a sectional view of a zoom lens at a wide angle end according to a fifth embodiment of the present invention.

In a zoom lens according to a fifth embodiment illustrated in FIG. 9, the first lens unit L1 includes a negative lens G11 having a meniscus shape that has a convex surface on the object side, a negative lens G12 having a biconcave shape, and a positive lens G13 having a meniscus shape that has a convex surface on the object side.

The second lens unit L2 includes a positive lens G21 having a biconvex shape, a positive lens G22 having a biconvex shape, and a negative lens G23 having a meniscus shape that has a convex surface on the object side. The positive lens G21 has aspheric shapes on both surfaces.

The third lens unit L3 includes a biconvex positive lens G31.

Figure 10:
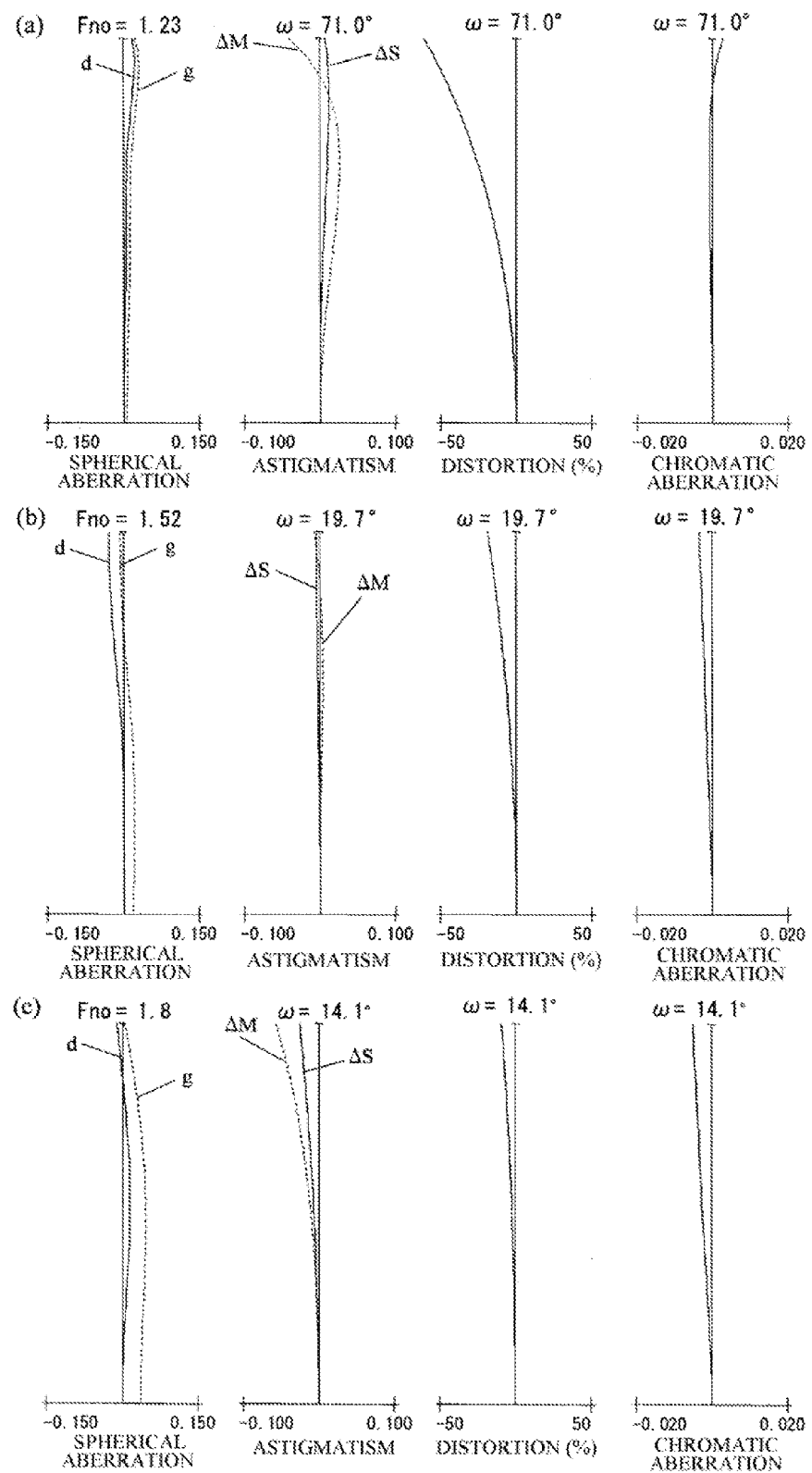
FIG. 10 is an aberrational diagram of a zoom lens at the wide angle end, an intermediate zoom position, and a telephoto end according to the fifth embodiment.

Table 5 illustrates data of numerical example 5 corresponding to the fifth embodiment. FIG. 10 illustrates an aberrational diagram of the fifth embodiment (numerical example 5).

In the first to fifth embodiments, the aperture stop SP is arranged between the first lens unit L1 and the second lens unit L2, and configured stationary (or fixed) during zooming. By fixing the aperture stop SP during zooming, the driving load can become smaller than a case where the aperture stop SP is moved (driven).

In each of the embodiments 1 to 5, focusing is provided by moving the third lens unit L3. For example, in focusing upon the closest object from the infinitely distant object, the third lens unit L3 is moved to the object side.

Moreover, in each of the embodiments 1 to 5, zooming is provided by moving the first, second, and third lens units L1, L2, and L3. In zooming from the wide angle end to the telephoto end, the first lens unit L1 is moved from the object side to the image side, the second and third lens units L2 and L3 are moved from the image side to the object side by changing their interval.

The zoom lens of each embodiment (each numerical example) satisfies the conditions (1) and (2) as illustrated in Table 6. Thereby, a small zoom lens having a wide angle of view, a high zoom ratio, and a high optical performance over an overall zoom range can be implemented. Moreover, as illustrated in Table 6, the zoom lens of each embodiment (each numerical example) satisfies the conditions (3) to (10).

In each embodiment, the shape of each lens and the number of lenses in each lens unit can be modified appropriately.

In addition, in each embodiment, the aperture stop SP is arranged closer to the object than the second lens unit L2, but may be arranged at another location. For example, the aperture stop SP may be arranged in the second lens unit L2 or closer to the image side than the second lens unit L2. In addition, the aperture stop SP may be moved during zooming.

An aspheric lens is not limited to a glass material, and may be a hybrid type that has an aspheric surface (component) made of a resin material on a spherical lens surface, or may be made of a plastic material.

One of the lens units in the zoom lens or one lens in the lens unit in the zoom lens may be moved or shifted so as to have a component in a direction orthogonal to the optical axis for image stabilizations under camera vibrations or unintentional movements of hands.

In numerical value data illustrated in Tables to 5, a surface number (i) denotes the order of a surface from the object side to the image side, denotes a radius of curvature of that surface, and "d" denotes an interval between the i-th surface and the (i+1) surface. "nd" and "vd" are a refractive index and an Abbe number to the d-line.

In each numerical example, two surfaces closest to the image side are planes corresponding to the incident surface and the exit surface of the optical block G. The aspheric shape is expressed as follows where "x" denotes a displacement in the optical axis direction at a position of a height "h" from the optical axis based on a surface vertex, "r" is a paraxial radius of curvature, "K" is a cone constant, and A4, A6, A8, and A10 are fourth, sixth, eighth, and tenth aspheric coefficients:

$$x=(h^2/r)/[1+\{1-(1+K)(h/r)^2\}^{1/2}]+A4 \cdot h^4+A6 \cdot h^6+A8 \cdot h^8+A10 \cdot h^{10}$$

"e-Z" means "$\times 10^{-z}$."

TABLE 1

[Numerical Example 1]

Surface Data

| Surface No. | r | d | nd | vd |
|---|---|---|---|---|
| 1 | 31.612 | 1.05 | 1.88300 | 40.8 |
| 2 | 8.065 | 5.62 | | |
| 3 | −28.881 | 0.75 | 1.60311 | 60.6 |
| 4 | 13.568 | 1.32 | | |
| 5 | 15.702 | 2 | 1.92286 | 18.9 |
| 6 | 39.527 | (variable) | | |
| 7 (Stop) | ∞ | (variable) | | |
| 8* | 13.032 | 3.09 | 1.69350 | 53.2 |
| 9* | −43.33 | 0.23 | | |
| 10 | 12.047 | 3.87 | 1.48749 | 70.2 |
| 11 | −30.488 | 0.15 | | |
| 12 | 19.494 | 0.9 | 1.92286 | 18.9 |
| 13 | 6.809 | (variable) | | |
| 14 | 16.944 | 1.76 | 1.69680 | 55.5 |
| 15 | −31.298 | (variable) | | |
| 16 | ∞ | 2 | 1.54400 | 60.0 |
| Image Plane | ∞ | | | |

Aspheric Data

Eighth Surface

K = −1.76140   A4 = −3.01782e−5
A6 = −7.38647e−8   A8 = −3.13890e−8

Ninth Surface

K = −1.53896e   A4 = 7.98255e−5
A6 = −6.35391e−7   A8 = −2.20537e−8

Various Data

| Zoom Ratio | | 2.9 | |
|---|---|---|---|
| | Wide Angle | Intermediate | Telephoto |
| Focal Length | 2.85 | 5.56 | 8.27 |
| F number | 1.24 | 1.63 | 2.03 |
| Angle of View | 65.0 | 15.5 | 10.4 |

TABLE 1-continued

[Numerical Example 1]

| | | | |
|---|---|---|---|
| Image Height | 3.0 | 3.0 | 3.0 |
| Lens Overall Length | 58.1 | 44.8 | 42.7 |

| Interval | Wide Angle | Intermediate | Telephoto |
|---|---|---|---|
| d6 | 18.47 | 5.21 | 3.03 |
| d7 | 8.48 | 4.84 | 1.20 |
| d13 | 3.35 | 3.34 | 3.33 |
| d15 | 4.01 | 7.66 | 11.31 |

TABLE 2

[Numerical Example 2]

Surface Data

| Surface No. | r | d | nd | vd |
|---|---|---|---|---|
| 1 | 40.7 | 1.5 | 1.88300 | 40.8 |
| 2 | 9.951 | 7.53 | | |
| 3 | −27.289 | 0.75 | 1.69680 | 55.5 |
| 4 | 45.208 | 0.63 | | |
| 5 | 28.207 | 2.17 | 2.00272 | 19.3 |
| 6 | 119.554 | (variable) | | |
| 7 (Stop) | ∞ | (variable) | | |
| 8* | 13.984 | 2.72 | 1.69350 | 53.2 |
| 9* | 225.687 | 0.23 | | |
| 10 | 14.024 | 4.19 | 1.49700 | 81.5 |
| 11 | −25.218 | 0.23 | | |
| 12 | 191.695 | 1.9 | 1.60311 | 60.6 |
| 13 | −33.472 | 0.2 | | |
| 14 | 15.94 | 0.65 | 1.92286 | 20.9 |
| 15 | 6.265 | (variable) | | |
| 16 | 10.139 | 2.1 | 1.88300 | 40.8 |
| 17 | 15.756 | (variable) | | |
| 18 | ∞ | 2 | 1.54400 | 60.0 |
| Image Plane | ∞ | | | |

Aspheric Data

Eighth Surface

K = −2.15155    A4 = 1.27203e−5
A6 = −1.92590e−8    A8 = −1.82776e−8
Ninth Surface K = 0.00000    A4 = 1.02207e−4
A6 = 2.62614e−7    A8 = −1.46737e−8

Various Data

| Zoom Ratio | | 4.9 | |
|---|---|---|---|
| | Wide Angle | Intermediate | Telephoto |
| Focal Length | 2.85 | 8.30 | 13.96 |
| F Number | 1.27 | 1.94 | 2.68 |
| Angle of View | 67.1 | 10.4 | 6.1 |
| Image height | 3.0 | 3.0 | 3.0 |
| Lens overall length | 81.0 | 50.8 | 48.8 |

| Interval | Wide Angle | Intermediate | Telephoto |
|---|---|---|---|
| d6 | 4.24 | 2.31 | 2.15 |
| d7 | 12.25 | 6.73 | 1.20 |
| d15 | 3.48 | 2.86 | 2.24 |
| d17 | 2.89 | 9.04 | 15.18 |

TABLE 3

[Numerical Example 3]

Surface Data

| Surface No. | r | d | nd | vd |
|---|---|---|---|---|
| 1 | 36.808 | 1.5 | 1.88300 | 40.8 |
| 2 | 10.784 | 7.07 | | |
| 3 | −35.099 | 1.01 | 1.60311 | 60.6 |
| 4 | 16.306 | 3.29 | | |
| 5 | 25.994 | 2 | 1.94595 | 18.0 |
| 6 | 69.028 | (variable) | | |
| 7 (stop) | ∞ | (variable) | | |
| 8* | 21.089 | 2.88 | 1.69350 | 53.2 |
| 9* | −86.231 | 0.23 | | |
| 10 | 16.497 | 4.38 | 1.49700 | 81.5 |
| 11 | −24.264 | 0.4 | | |
| 12 | 65.251 | 2.31 | 1.48749 | 70.2 |
| 13 | −22.793 | 0.2 | | |
| 14 | 17.198 | 0.9 | 1.94595 | 18.0 |
| 15 | 7.274 | (variable) | | |
| 16 | 23.266 | 2.22 | 1.80610 | 40.9 |
| 17 | 829.165 | (variable) | | |
| 18 | ∞ | 2 | 1.54400 | 60.0 |
| Image Plane | ∞ | | | |

Aspheric Data

Eighth Surface

K = −3.50735    A4 = −1.89089e−5    A6 = −1.80705e−8
A8 = −7.12567e−9    A10 = −5.16441e−11
Ninth Surface K = 0.00000    A4 = 1.05137e−4
A6 = 4.12833e−7    A8 = −8.15268e−9

Various Data

| Zoom Ratio | | 3.0 | |
|---|---|---|---|
| | Wide Angle | Intermediate | Telephoto |
| Focal Length | 2.70 | 5.35 | 8.06 |
| F number | 1.10 | 1.45 | 1.81 |
| Angle of View | 69.5 | 16.1 | 10.6 |
| Image height | 3.0 | 3.0 | 3.0 |
| Lens overall length | 79.9 | 56.6 | 50.7 |

| Interval | Wide Angle | Intermediate | Telephoto |
|---|---|---|---|
| d6 | 34.92 | 11.61 | 5.69 |
| d7 | 7.27 | 4.23 | 1.20 |
| d15 | 3.35 | 3.03 | 2.71 |
| d17 | 2.80 | 6.16 | 9.51 |

TABLE 4

[Numerical Example 4]

Surface Data

| Surface No. | r | d | nd | vd |
|---|---|---|---|---|
| 1 | 22.28 | 1.5 | 1.88300 | 40.8 |
| 2 | 7.771 | 6.65 | | |
| 3 | −19.993 | 0.75 | 1.69680 | 55.5 |
| 4 | 23.208 | 1.07 | | |
| 5 | 21.875 | 2 | 1.94595 | 18.0 |
| 6 | 93.076 | (variable) | | |
| 7 (stop) | ∞ | (variable) | | |
| 8* | 11.444 | 2.98 | 1.69350 | 53.2 |

TABLE 4-continued

[Numerical Example 4]

| | | | | |
|---|---|---|---|---|
| 9* | 192.462 | 0.23 | | |
| 10 | 12.87 | 3.59 | 1.49700 | 81.5 |
| 11 | −24.092 | 1.15 | | |
| 12 | 18.402 | 0.7 | 1.92286 | 18.9 |
| 13 | 6.589 | (variable) | | |
| 14 | 10.85 | 2.01 | 1.69350 | 53.2 |
| 15 | −160.968 | (variable) | | |
| 16 | ∞ | 2 | 1.54400 | 60.0 |
| Image Plane | ∞ | | | |

Aspheric Data

Eighth Surface

K = −1.30558  A4 = 5.27322e−5
A6 = 6.81035e−7  A8 = 4.31956e−9

Ninth Surface

K = 0.00000  A4 = 1.64904e−4
A6 = 9.97833e−7  A8 = 7.65853e−9

Various Data

| Zoom Ratio | | 3.2 | |
|---|---|---|---|
| | Wide Angle | Intermediate | Telephoto |
| Focal Length | 2.90 | 5.96 | 9.35 |
| F number | 1.25 | 1.69 | 2.21 |
| Angle of View | 63.4 | 14.5 | 9.1 |
| Image height | 3.0 | 3.0 | 3.0 |
| Lens overall length | 63.0 | 46.6 | 43.7 |

| Interval | Wide Angle | Intermediate | Telephoto |
|---|---|---|---|
| d6 | 22.20 | 5.82 | 2.88 |
| d7 | 7.92 | 4.56 | 1.20 |
| d13 | 3.35 | 2.40 | 1.45 |
| d15 | 2.90 | 7.21 | 11.52 |

TABLE 5

[Numerical Example 5]

Surface Data

| Surface No. | r | d | nd | vd |
|---|---|---|---|---|
| 1 | 27.139 | 1.6 | 1.69680 | 55.5 |
| 2 | 7.882 | 6.73 | | |
| 3 | −29.826 | 1 | 1.77250 | 49.6 |
| 4 | 12.099 | 1.59 | | |
| 5 | 15.187 | 2 | 1.94595 | 18.0 |
| 6 | 33.635 | (variable) | | |
| 7 (stop) | ∞ | (variable) | | |
| 8* | 15.088 | 2.93 | 1.69350 | 53.2 |
| 9* | −44.504 | 0.23 | | |
| 10 | 12.178 | 4.11 | 1.49700 | 81.5 |
| 11 | −19.207 | 0.28 | | |
| 12 | 22.857 | 0.82 | 1.92286 | 20.9 |
| 13 | 7.181 | (variable) | | |
| 14 | 15.245 | 2.13 | 1.71999 | 50.2 |
| 15 | −36.661 | (variable) | | |
| 16 | ∞ | 2.5 | 1.54400 | 60.0 |
| Image Plane | ∞ | (variable) | | |

Aspheric Data

Eighth Surface

K = −2.16773  A4 = −3.62162e−5
A6 = −6.21494e−7  A8 = −2.91076e−8

Ninth Surface

K = −4.73365e−2  A4 = 1.09840e−4
A6 = −7.76954e−7  A8 = −1.44475e−8

Various Data

| Zoom Ratio | | 2.3 | |
|---|---|---|---|
| | Wide Angle | Intermediate | Telephoto |
| Focal Length | 2.63 | 4.38 | 6.13 |
| F number | 1.23 | 1.52 | 1.80 |
| Angle of View | 71.0 | 19.7 | 14.1 |
| Image height | 3.0 | 3.0 | 3.0 |
| Lens overall length | 60.3 | 49.6 | 46.6 |

| Interval | Wide Angle | Intermediate | Telephoto |
|---|---|---|---|
| d6 | 19.84 | 9.19 | 6.13 |
| d7 | 6.36 | 3.74 | 1.11 |
| d13 | 3.32 | 3.32 | 3.31 |
| d15 | 1.59 | 4.22 | 6.84 |

TABLE 6

| | | Numerical Example | | | | |
|---|---|---|---|---|---|---|
| | | 1 | 2 | 3 | 4 | 5 |
| Cond. (1) | f1/f2 | −0.59 | −0.76 | −0.74 | −0.57 | −0.52 |
| Cond. (2) | f1/fw | −2.99 | −4.19 | −4.05 | −3.11 | −2.90 |
| Cond. (3) | f3/f2 | 1.15 | 1.74 | 2.02 | 0.93 | 1.03 |
| Cond. (4) | |β3w/β3t| | 5.31 | 2.72 | 1.41 | 6.21 | 3.01 |
| Cond. (5) | |β2w/β2t| | 0.06 | 0.08 | 0.24 | 0.05 | 0.14 |
| Cond. (6) | ν(2−3)P | 59.6 | 59.0 | 61.5 | 62.6 | 61.7 |
| Cond. (7) | N1P | 1.92 | 2.00 | 1.95 | 1.95 | 1.95 |
| Cond. (8) | ν1P | 18.90 | 19.32 | 17.98 | 17.98 | 17.98 |
| Cond. (9) | $M2/\sqrt{fw \cdot ft}$ | 1.501 | 1.752 | 1.299 | 1.286 | 1.306 |
| Cond. (10) | $M3/\sqrt{fw \cdot ft}$ | 1.505 | 1.949 | 1.436 | 1.650 | 1.310 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-158663, filed Jul. 13, 2010, which is hereby incorporated by reference herein in its entirety.

What is claimed is:

1. A zoom lens comprising:
in order from an object side to an image side, a first lens unit having a negative refractive power, a second lens unit having a positive refractive power, and a third lens unit having a positive refractive power,
wherein the second and third lens units are configured to move in an optical axis direction for a magnification variation, and the first lens unit is configured to move in the optical axis direction to reduce an image-plane fluctuation associated with the magnification variation,
wherein the third lens unit is configured to move to the object side in zooming from a wide-angle end to a telephoto end, and
wherein the following conditions are satisfied:

$-0.83 \leq f1/f2 \leq -0.40;$ $-4.6 \leq f1/fw \leq -2.5;$ and $0.01 \leq |\beta 2w/\beta 2t| \leq 0.35,$ where f1 is a focal length of the first lens unit, f2 is a focal length of the second lens unit, fw is a focal length of the entire zoom lens at the wide-angle end, $\beta 2w$ is an imaging magnification of the second lens unit at the wide-angle end, and $\beta 2t$ is an imaging magnification of the second lens unit at the telephoto end.

2. The zoom lens according to claim 1, wherein:
the third lens unit is moved to the object side in focusing from an in-focus state to an infinitely distant object to an in-focus state to a closest object, and
the following condition is satisfied:

$0.85 \leq f3/f2 \leq 2.50,$ where f3 is a focal length of the third lens unit.

3. The zoom lens according to claim 1, wherein the following condition is satisfied:

$1.0 \leq |\beta 3w/\beta 3t| \leq 8.0,$ where $\beta 3w$ is an imaging magnification of the third lens unit at the wide-angle end, and $\beta 3t$ is an imaging magnification of the third lens unit at the telephoto end.

4. The zoom lens according to claim 1, wherein the following condition is satisfied:

$50 \leq v(2-3)P,$ where $v(2-3)P$ is an average Abbe number of positive lenses included in the second lens unit and the third lens unit.

5. The zoom lens according to claim 1, wherein:
the first lens unit includes a positive lens, and
the following conditions are satisfied:

$1.85 \leq N1P \leq 2.15;$ and $13 \leq v1P \leq 25,$ where N1P is a refractive index of the positive lens included in the first lens unit, and v1P is an Abbe number of the positive lens included in the first lens unit.

6. The zoom lens according to claim 1, wherein the following condition is satisfied:

$0.9 \leq M2/\sqrt{(fw \cdot ft)} \leq 2.1,$ where ft is a focal length of the entire zoom lens at the telephoto end, and M2 is a moving amount of the second lens unit in the magnification variation from the wide-angle end to the telephoto end.

7. The zoom lens according to claim 1, wherein the following condition is satisfied:

$0.9 \leq M3/\sqrt{(fw \cdot ft)} \leq 2.1,$ where ft is a focal length of the entire zoom lens at the telephoto end, and M3 is a moving amount of the third lens unit in the magnification variation from the wide-angle end to the telephoto end.

8. An image pickup apparatus comprising:
a zoom lens comprising, in order from an object side to an image side, a first lens unit having a negative refractive power, a second lens unit having a positive refractive power, and a third lens unit having a positive refractive power,
wherein the second and third lens units are configured to move in an optical axis direction for a magnification variation,
wherein the first lens unit is configured to move in the optical axis direction to reduce an image-plane fluctuation associated with the magnification variation,
wherein the third lens unit is configured to move to the object side in zooming from a wide-angle end to a telephoto end, and
wherein the following conditions are satisfied:

$-0.83 \leq f1/f2 \leq -0.40;$ $-4.6 \leq f1/fw \leq -2.5;$ and $0.01 \leq |\beta 2w/\beta 2t| \leq 0.35,$ where f1 is a focal length of the first lens unit, f2 is a focal length of the second lens unit, fw is a focal length of the entire zoom lens at the wide-angle end, $\beta 2w$ is an imaging magnification of the second lens unit at the wide-angle end, and $\beta 2t$ is an imaging magnification of the second lens unit at the telephoto end; and
an image pickup element configured to provide a photoelectric conversion to an optical image formed by the zoom lens.

* * * * *